United States Patent [19]

Buzzard et al.

[11] 4,143,339
[45] Mar. 6, 1979

[54] LASER PLASMA TUBE HAVING INTERNAL GAS PATH

[75] Inventors: Robert J. Buzzard, Palo Alto; Galen E. Mohler, Los Altos, both of Calif.

[73] Assignee: Lexel Corporation, Palo Alto, Calif.

[21] Appl. No.: 776,824

[22] Filed: Mar. 14, 1977

[51] Int. Cl.$^2$ ............................................. H01S 3/02
[52] U.S. Cl. ........................... 331/94.5 D; 313/204; 428/36
[58] Field of Search ................. 331/94.5 G, 94.5 D; 428/36; 138/177, 178; 313/220, 204; 165/156

[56] References Cited

U.S. PATENT DOCUMENTS

| 2,156,156 | 4/1939 | Mahlck ............................. 313/204 |
| 3,582,821 | 6/1971 | Gordon et al. ................. 331/94.5 D |
| 3,982,204 | 9/1976 | Andringa ......................... 331/94.5 D |

FOREIGN PATENT DOCUMENTS 1249241 10/1971 United Kingdom ............... 331/94.5 D

*Primary Examiner*—William L. Sikes
*Attorney, Agent, or Firm*—C. Michael Zimmerman

[57] ABSTRACT

Several embodiments of a gas laser plasma tube are described having one or more internal gas return paths doubled back upon themselves within the structure which defines the gaseous discharge bore, to increase their length so that electrical gaseous discharge in the same is inhibited.

18 Claims, 6 Drawing Figures

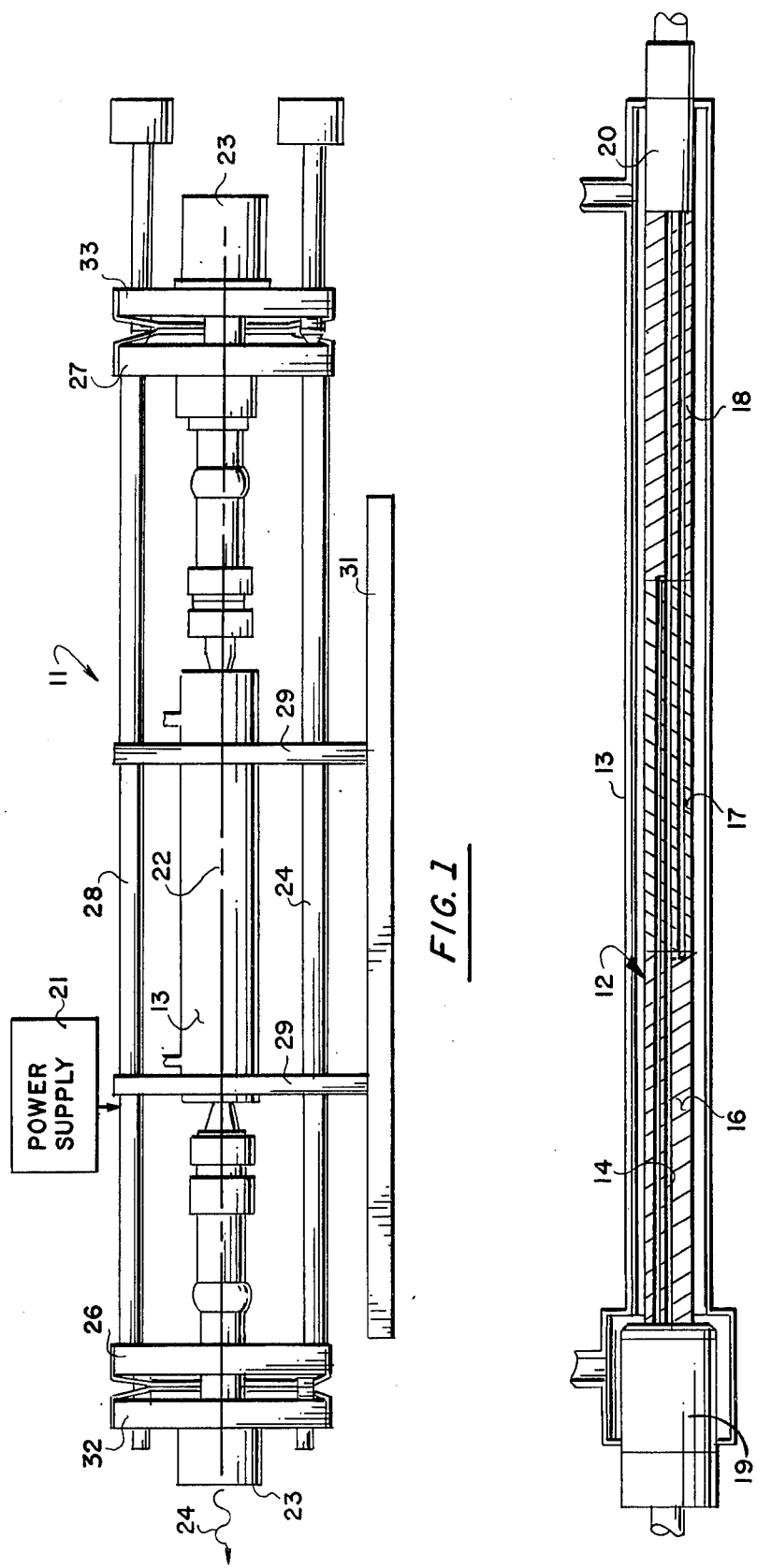

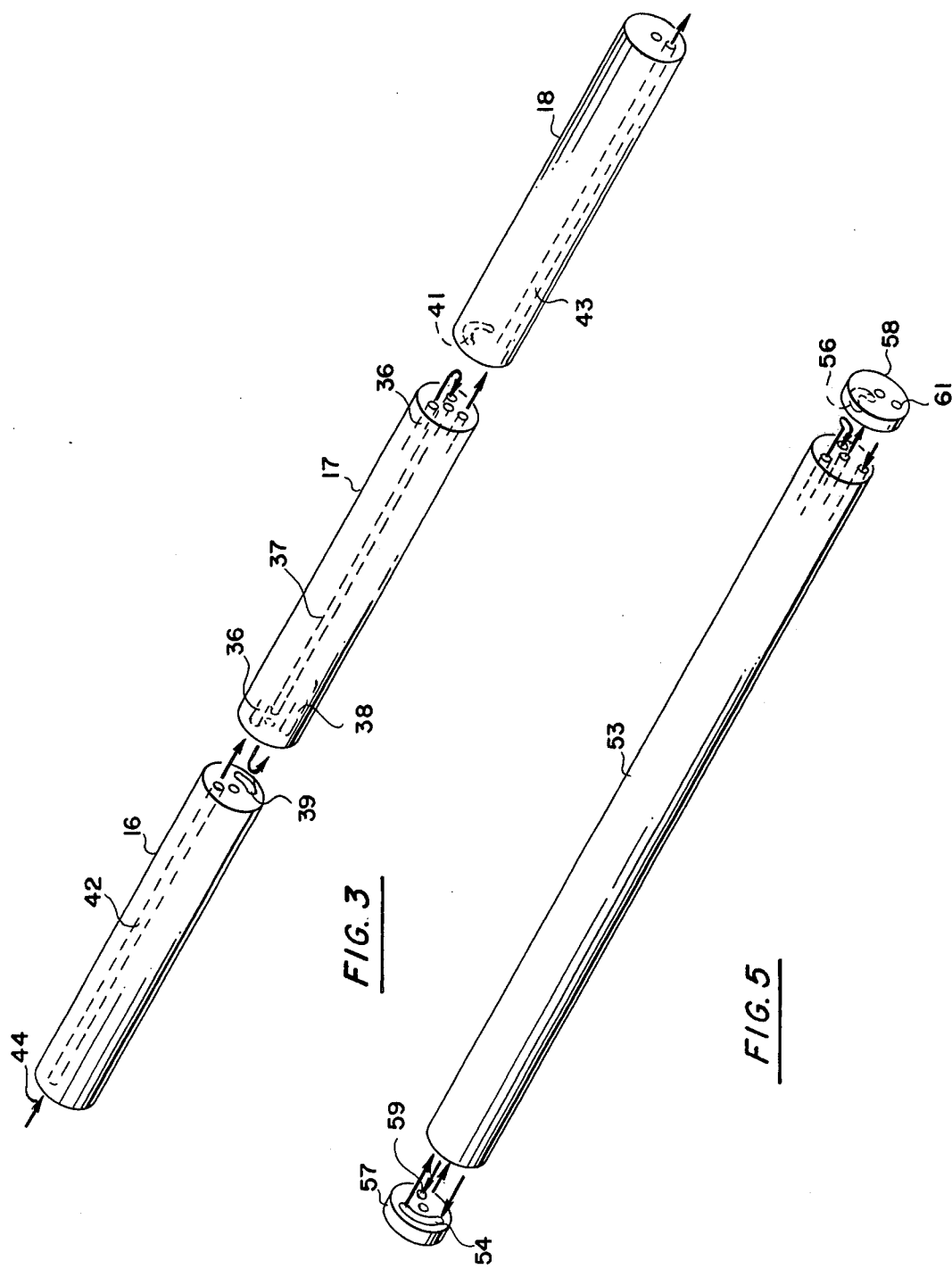

LASER PLASMA TUBE HAVING INTERNAL GAS PATH

BACKGROUND OF THE INVENTION

The present invention relates to lasers and, more particularly, to a gas laser plasma tube having a gas return path within the structure defining the discharge cavity, which return path is of a design inhibiting gaseous discharge along such path even in relatively high powered lasers.

Ion gas lasers produce coherent radiation from an electrical gaseous discharge. Such gaseous discharge takes place within a plasma tube having structure defining a discharge cavity between anode and cathode assemblies. Such structure typically is a cylinder of a high temperature material, such as ceramic, positioned between the anode and cathode, and the discharge cavity is an axial bore extending through such cylinder.

The gaseous discharge causes gas to flow through the discharge cavity from one end to the other. It is therefore common practice to include structure of one sort or another defining a gas return path extending between the ends of the discharge cavity to allow the pressures at such ends to be equalized. Traditionally, the gas return path in most lasers has been defined by structure, such as glass tubing, provided as an external appendage to the plasma tube. Such external arrangements, though, are relatively fragile and are not uncommonly broken. To avoid such fragility, lasers are now made incorporating the gas return path directly into the structure of the plasma tube which defines the discharge cavity. In those lasers in which the structure providing the discharge cavity is a cylinder of a high temperature material, the gas return path typically is provided by one or more bores which extend through the cylinder parallel to the discharge cavity. Care must be taken with such a structure, however, to assure that the gaseous discharge is confined to the discharge cavity and is not also initiated along the gas return path bores. Various approaches have been used in the past to so restrict the gaseous discharge. U.S. Pat. No. 3,624,543 describes one approach in which the gas return path bores generally have a smaller transverse cross-sectional area than the discharge cavity. Since the gaseous discharge will tend to follow the path of least resistance between the anode and cathode assemblies, such cross-sectional relationship will cause the discharge to take place preferentially in the discharge cavity. This approach is not entirely suitable, however, for relatively high powered lasers, i.e., lasers having an output power rating of 2 watts or more. That is, the same reduction in cross-section of the gas return paths used to inhibit gaseous discharge also inhibits gas return flow therethrough. Besides higher powered lasers having a greater anode-cathode potential differential making discharge in an internal gas return path more likely, they typically have a higher rate of gas flow through the discharge cavity and it is difficult to obtain sufficient return gas flow for smooth operation. Another approach to preventing discharge in internal gas return path bores has been to insert restrictions, such as mesh or thin discs, in the return paths to inhibit gaseous discharge. Again, such restrictions also may tend to inhibit gas flow and reduce the effectiveness of the path to return gas as intended.

SUMMARY OF THE INVENTION

The present invention provides a plasma tube for a gas laser having a gas return path within the structure which also defines the discharge cavity, which return path effectively inhibits gaseous discharge through the same while not appreciably inhibiting gas flow therethrough. In its most basic aspects, the gas return path is made to double back upon itself within the structure which defines the discharge cavity. In this connection, the phrases "double back upon itself" and "doubling back upon itself" as used to describe the gas return path mean that the path includes directional components in opposition to one another, and not that the path itself is doubled in length.

The gaseous discharge will take place preferentially along the path of least resistance between the anode and cathode, and it has been found that the increased length of the gas return path associated with the doubling back will inhibit such discharge from taking place therein, without requiring that the return path have a component which is exterior of the structure defining the discharge cavity. Thus, gaseous discharge will take place preferentially in the discharge cavity without the gas return path having to be defined by appendages or other special means outside of the structure which defines the discharge cavity. In fact, depending upon the amount by which the gas return path is made longer than the discharge cavity by such doubling back, the transverse cross-sectional area of the gas return path can be made as large and even larger than that of the optical cavity. The result is that rather than restrict the flow of gas therethrough, the gas return path has a geometry which enhances gas conductance. In this connection, while adding length to the gas return path may have a tendency to slow the response of the path to differential pressure changes at the opposite ends of the optical cavity, with the invention no slower response time has been noted.

Most desirably, the discharge cavity defines a generally straight-line path through the tube for the electrical gaseous discharge. This enhances the likelihood that the gaseous discharge will take place in the discharge cavity rather than along the gas return path. That is, the line-of-sight between the anode and cathode assemblies provided by the discharge cavity will encourage discharge therealong, whereas the non-linearity of the gas return path will inhibit the same. Also most desirably the doubling back of the gas return path is provided by including one or more bends therein of generally 180° so that the path will have adjacent, generally parallel sections. This is simply accomplished by providing all or part of the cylinder containing the discharge cavity with at least three separate bores defining the gas return path and means communicating opposite ends of a first one of such bores with second and third ones of such bores, respectively.

The invention includes other features and advantages which will be described in connection with the following description of several preferred embodiments.

BRIEF DESCRIPTION OF THE DRAWING

With reference to the accompanying three sheets of drawing:

FIG. 1 is an elevation view of an ion gas laser incorporating a preferred embodiment of the invention;

FIG. 2 is an enlarged, partly-sectioned view illustrating the plasma tube and electrode assemblies of the preferred embodiment of the invention illustrated in FIG. 1;

FIG. 3 is an exploded, isometric view of the plasma tube of the preferred embodiment illustrated in FIG. 1;

FIG. 5 is an isometric view of another preferred embodiment of a plasma tube of the invention.

DETAILED DESCRIPTION OF THE PREFERRED EMBODIMENT

Figure 4:
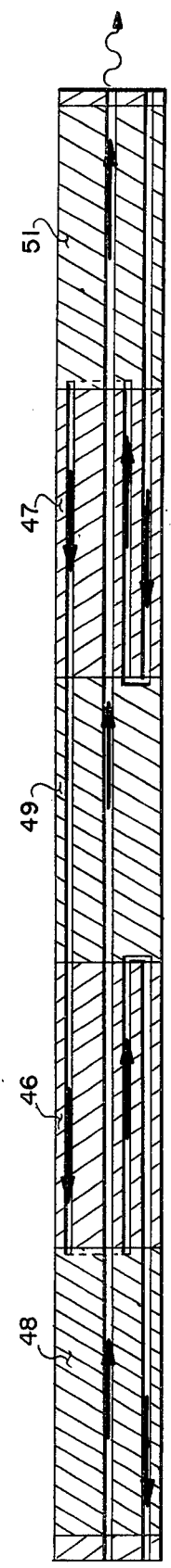
FIGS. 4 and 6 are schematic sectional views illustrating alternate preferred embodiments of the invention.

A preferred embodiment of a gas ion laser incorporating the present invention is illustrated in FIGS. 1 through 3 of the drawings. Laser 11 includes an elongated plasma tube 12 enclosed within a cooling water jacket 13. In the type of laser construction to which the present invention relates, the plasma tube 12 consists essentially only of that structure which defines the gaseous discharge cavity. To this end, plasma tube 12 has an axial bore 14 extending lengthwise thereof which encloses a lasable medium, i.e., quantum resonant particles, such as an ionized noble gas, at a pressure of about 1 torr. Plasma tube 12 is a cylinder of a high temperature material, e.g., BeO ceramic, made up of three cylindrical segments 16, 17 and 18 which are axially aligned and placed end-to-end. The discharge cavity 14, i.e., the volume within the plasma tube within which substantially all of the discharge is confined, is defined at least in part by aligned, separate axial bores in the three segments. In the preferred embodiment being described, the axial bore 14 provides essentially the full volume within which the discharge is confined and is therefore structurally synonomous with the discharge cavity.

As is conventional, means are included for initiating gaseous discharge within discharge cavity 14. That is, cathode and anode assemblies 19 and 20, respectively, are provided at opposite ends of the plasma tube. A power supply, schematically represented at 21 in FIG. 1, is also conventionally provided as part of such means for applying the requisite differential voltages to the cathode and anode for the desired gaseous discharge. The discharge will generate optical radiation, i.e., visible, infrared or ultraviolet radiation, in the discharge cavity 14 of the tube for propagation along the axis 22 (FIG. 1) of the laser, which radiation will pass through windows at the opposite ends of the plasma tube and be reflected by optical reflector assemblies or mirrors 23 back and forth through the discharge cavity 14 a sufficient number of times to sustain laser oscillation. Transmission of optical radiation through one of the reflectors as represented at 24 constitutes the coherent radiation output of the laser.

Laser 11 further includes resonator structure which maintains the reflectors or mirrors 23 at its opposite ends at predetermined relative orientations and a set distance apart. More particularly, it includes a pair of rectangular reference plates 26 and 27 positioned adjacent opposite ends of the laser optical cavity. Plates 26 and 27 are rigidly held in position relative to one another by three rods 28 (two of which are shown) connected between three of the four corners of the respective reference plates. The rods 28 are selected to have low thermal expansion in the direction of the laser optical axis over the ambient temperature range to which they are expected to be subjected during operation of the laser. The rods 28 and, hence, the remainder of the laser are supported by uprights 29 extending upwardly from a base 31.

Reference plates 26 and 27 are used to provide a reference base from which the optical reflectors 23 of the laser are mounted on opposite ends of the optical cavity. In this connection, the reflector assemblies include rectangular mounting plates 32 and 33 positioned parallel and adjacent the respective reference plates 26 and 27. The mounting plates are connected to the reference plates by the tuning bolt-leaf spring separator arrangement described in U.S. Pat. No. 3,864,029 issued Feb. 4, 1975, the disclosure of which is hereby incorporated by reference.

As mentioned previously, the electrical discharge tends to cause gas to flow through the discharge cavity, with the consequence that differential pressures tend to be created at the anode and cathode assemblies. In order to equalize such pressure, it is the practice to provide a gas return path between the ends of the discharge cavity, separate and apart from such cavity. It has not been practical, however, to utilize internal gas return paths, i.e., paths which extend through the cylinder of high temperature material which defines the discharge cavity, in higher powered lasers. The higher potential differences which must be applied between the anode and cathodes to obtain the higher output power sometimes cause the gaseous discharge to follow gas paths other than the one defined by the discharge cavity. Moreover, the rate of change of pressure between the ends of the discharge cavity is often greater than can be handled by conventional designs of internal gas paths.

The present invention provides a simple internal gas return path design which effectively inhibits discharge therein without affecting the capability of such path to equalize the gas pressure at the opposite ends of the gas discharge cavity. Such gas return path is similar to prior designs of internal gas return paths in the sense that it is provided by bores extending through the segments 16, 17 and 18. However, in keeping with the invention, the gas return path is made substantially longer than the discharge cavity by being doubled back upon itself. Because of this doubling back, the transverse cross-sectional area of the cavity can be made sufficiently great to accommodate the amount of gas flow required in higher powered lasers without causing discharge to also occur in the gas return path. Moreover, the gas return path is non-linear between the ends of the optical cavity, whereas the discharge cavity defines, as is usual, a straight-line path between the anode and cathode. The non-linearity in the gas return path will not significantly affect gas flow therethrough but it will inhibit the formation of a discharge arc between the differing potentials which cause the same.

Most simply and effectively, the gas return path is defined by at least three separate bores which extend through at least part of the plasma tube cylinder 12, one of such bores being communicated with the other two at its opposite ends, respectively. That is, the center segment 17 has three separate gas return path bores defining a doubled-back gas return path through such segment having adjacent, generally parallel sections. In this connection, means are provided to communicate the opposite ends of one of such bores, bore 37, with the other two bores, bores 36 and 38, for serial flow therethrough. Such means includes, in this preferred embodiment, at each end of the segment 17, channels 39 and 41, respectively, in those ends of segments 16 and 18 adjacent the segment 17. Channel 39 is positioned to communicate one end of the bore 37 with a first end of the bore 38, whereas channel 41 is positioned to communicate the other end of the bore 37 with the corresponding end of bore 36. The gas return path bore 42 in segment 18 is aligned with the other end of bore 38.

Gas return flow along the resulting path will be described assuming flow from the cathode end of the plasma tube to the anode end as represented by the arrows 44. Gas flowing from the cathode end will enter the section of the gas return path defined by the bore 42 in the segment 16, flow through bore 36 in segment 17 and be doubled-back by channel 41 for flow through bore 37 also in segment 17. Channel 39 will double back into bore 38 gas exiting the path section provided by bore 37, for flow again through segment 17. The flow from the path section provided by bore 38 will pass into the path section defined by the bore 43 in segment 18, and thence to the anode end of the plasma tube.

It will be recognized from the above that the internal gas return path provided by the respective bores in the segments 16 and 17 and 18 includes two 180° bends, i.e., the two bends provided by the channels 39 and 41. If the segments 16, 17 and 18 are of equal length, it will be seen that the doubling back in the segment 17 causes the gas return path to have essentially twice the length of the discharge cavity, permitting for good gas conductance the transverse cross-sectional area of the gas return path to be generally at least as great for substantially its full length as the transverse cross-sectional area of the discharge cavity.

It will be recognized that the path sections are defined in each of the segments by straight-line bores. This facilitates construction of the gas return path. The channels which provide the bends in the path are simply formed at the exposed ends of segments. It should be noted that as used herein the term "bore" is not meant to connote any particular manner in which the void or voids to which it refers is constructed, nor that such void necessarily has a circular cross-section.

It will be apparent from the above that various arrangements can incorporate the internal gas return path design of the present invention. For example, a number of segments different from three could be provided. FIG. 4 illustrates a five, end-to-end segment plasma tube incorporating the present invention. Two of such segments, segments 46 and 47 are each provided with three gas return path bores. Such segments are separted by the other three segments 48, 49 and 51, and the communication channels are provided in the ends of such other segments which are adjacent segments 46 and 47 having the gas return path bores. A multiple of segments greater than three are often desirable in higher powered lasers which require a greater length of plasma tube cylinder.

While in both embodiments described to this point, the segments having three bores abut segments which only have one bore, it is not necessary that they be so arranged. For example, in the embodiment of FIG. 4, the segment 49 can be removed from between the segments 46 and 47 so that the three sections of one communicate directly with the three path sections of the other. It will be noted, though, that such direct communication of such multiple path section segments with one another eliminates some doubling back. In the embodiment of FIG. 4, the removal of the segment 49 would eliminate the two 180° bends provided by it between the segments 46 and 47.

FIG. 5 illustrates another preferred embodiment of the invention incorporated into a plasma tube cylinder which is essentially a single integral piece. With reference to such figure, the illustrated single piece plasma tube 53 has in it for its full length three bores defining three separate sections of the gas return path. The means communicating such bores are channels 54 and 56 respectively provided in the surfaces of caps 57 and 58 at the opposite ends of the cylinder 53. The channels 54 and 56 are similar to the communication channels utilized in the previously described embodiments in that they communicate opposite ends of a first one of the gas return path bores within the cylinder 53 with the second and third bores therewithin, respectively. Flow of return gas into and out of cylinder 53 is provided by bores 59 and 61 extending respectively through caps 57 and 58.

The gas return path of the embodiment of FIG. 5 passes three separate times through the cylinder 53, with the result that such path is three times as long as the discharge cavity.

Figure 6:
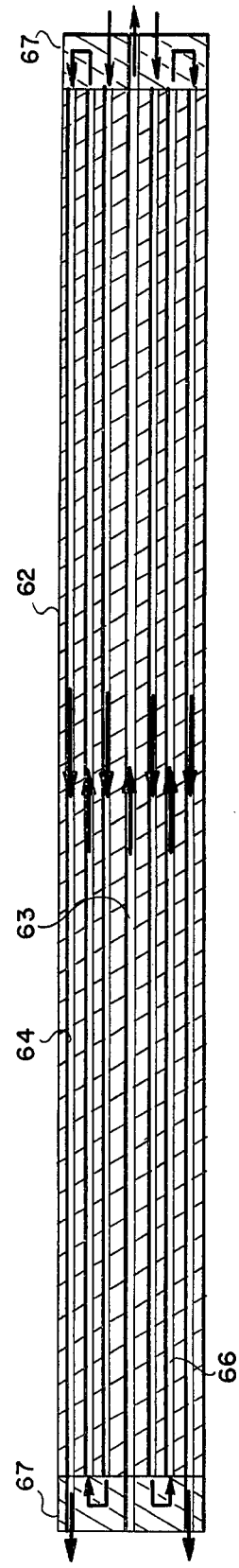

The invention is also applicable to arrangements in which more than one internal gas return path is provided through the plasma tube. That is, more than one separate gas return path can be provided through the tube to increase the gas conductance, any number of which can have the increased length and non-linear features of the present invention. The embodiment illustrated in FIG. 6 has a single piece plasma tube cylinder 62 having two separate gas return paths, each one of which is defined by three separate bores extending through the cylinder. In the schematic showing in FIG. 6, the separate paths are shown on the opposite sides of the discharge cavity 63. It will be recognized, however, that in an actual construction the bores through the cylinder providing the path sections preferably are equally spaced apart, to maximize the amount of structural material therebetween. The upper path 64 is defined by three bores communicating with one another in the manner discussed in the earlier embodiment. The second gas return path 66 is similarly defined by three bores below the discharge cavity 63. With such an arrangement, the transverse cross-sectional area of the individual gas return paths can be made smaller than the transverse cross-sectional area of the discharge cavity to further inhibit the formation of a gaseous discharge in the former. However, for best conductance, it is preferred that the total transverse cross-sectional area of the plurality of gas return paths be at least as great as the transverse cross-sectional area of the discharge cavity. While in this embodiment the channels providing communication between the bore sections are defined by caps 67 at opposite ends of the cylinder 62, a plurality of gas return paths incorporating the present invention can be provided in cylindrical segments of the type incorporated in the embodiments of FIGS. 1-3 and FIG. 4.

Although the invention has been described in connection with preferred embodiments thereof, it will be appreciated by those skilled in the art that various changes can be made without departing from its spirit. It is therefore intended that the coverage afforded applicant be limited only by the spirit of the invention as set forth in the claims and their equivalents.

We claim:

1. A plasma tube for a gas laser comprising structure having at least a portion of a generally straight-lined path discharge cavity extending lengthwise therethrough along which electrical gaseous discharge takes place for the generation of coherent energy, said structure also defining a gas return path extending therethrough from one end thereof to the other for return flow of gas from one end of said discharge cavity to the other, said gas return path including at least three sections within said structure having directional components parallel to the discharge cavity path, which sections are communicated with one another for serial flow therethrough in opposite directions to increase the length of the gas return path and thereby cause gaseous discharge to take place preferentially in said discharge cavity.

2. A gas laser plasma tube according to claim 1 wherein the transverse cross-sectional area of said gas return path is at least as great for generally the full length of said path as the transverse cross-sectional area of said portion of said discharge cavity within said structure.

3. A gas laser plasma tube according to claim 1 wherein said structure defines a bend in said gas return path of generally 180°, whereby said path is doubled back to have adjacent generally parallel sections.

4. A gas laser plasma tube according to claim 1 wherein said structure has a plurality of said gas return paths extending therethrough from one end thereof to the other.

5. A gas laser plasma tube according to claim 4 wherein the total transverse cross-sectional area of said plurality of gas return paths is at least as great as the transverse cross-sectional area of said portion of said discharge cavity within said structure.

6. A gas laser plasma tube according to claim 1 wherein said portion of said discharge cavity is defined by a bore extending through a cylinder of a high temperature material providing said structure, and said gas return path is provided by a separate bore or bores extending through said cylinder.

7. A gas laser plasma tube according to claim 6 wherein said gas return path is defined by three separate bores extending through said cylinder; and means are provided to communicate at a first end of said cylinder a first one of said gas return path bores with a second one of such bores, and means are provided to communicate at the opposite end of said cylinder said first one of said gas return path bores with the third one of said bores.

8. A gas laser comprising a plasma tube having a lasable medium, structure defining a generally straight-lined path discharge cavity extending therethrough for electrical gaseous discharge for the generation of optical energy, and means for initiating gaseous discharge within said discharge cavity, said structure also having a gas return path extending therethrough from one end thereof to the other for return flow of gas from one end of said discharge cavity to the other, said gas return path including at least three sections within said structure having directional components parallel to the discharge cavity path, which sections are communicated with one another for serial return gas flow therethrough in opposite directions to increase the length of the gas return path and thereby cause gaseous discharge to take place perferentially in said discharge cavity.

9. A gas laser according to claim 8 wherein said structure defines a plurality of said doubled-back gas return paths extending from one end thereof to the other, the total transverse cross-sectional area of said plurality of gas return paths being at least as great as the transverse cross-sectional area of said discharge cavity.

10. A gas laser according to claim 8 wherein said structure defines a bend in said gas return path of generally 180°, whereby said path is doubled back to have adjacent, generally parallel sections.

11. A gas laser according to claim 8 wherein said structure includes a cylinder of a high temperature material having a bore extending therethrough defining at least a portion of said discharge cavity, and said gas return path is provided by a separate bore or bores extending through said cylinder.

12. A gas laser according to claim 11 wherein said gas return path is defined by at least three separate bores in said cylinder; and means are provided to communicate a first end of a first one of said gas return path bores with a second one of such bores, and means are provided to communicate the opposite end of said first gas return path bore with the third one of said bores.

13. A gas laser according to claim 12 wherein said respective means to communicate said first and opposite ends of said first one of said gas return path bores with said second and third ones of said bores are caps at the ends of said cylinder defining channels at said bores ends providing said communication.

14. A gas laser according to claim 11 wherein said cylinder is comprised of an end-to-end plurality of cylindrical segments of said high temperature material; said gas return path is defined by at least three separate bores extending through at least one of said segments; and means are provided to communicate at a first end of said segment a first one of said gas return path bores with a second one of such bores, and means are provided to communicate at the opposite end of said segment said first gas return path bore with the third one of said bores.

15. A gas laser according to claim 14 wherein said means to communicate at a first end of said segment a first one of said gas return path bores with a second one of such bores includes structure defining a channel in the end of another segment adjacent said first end of said segment, extending between the ends of said first and second gas return path bores in said one segment.

16. A gas laser according to claim 14 wherein there are at least three end-to-end segments of high temperature material defining said cylinder, one of which is provided with said three gas return path bores.

17. A gas laser according to claim 16 wherein said segment having said three gas return path bores is the center one of said three end-to-end segments, and said respective means to communicate a first one of said gas return path bores with said second and third ones of said bores includes structure defining a channel in each of the ends of the other segments adjacent said center segment extending between said first gas return path bore and said second and third bores thereof, respectively.

18. A gas laser according to claim 16 wherein there are at least five end-to-end segments of high temperature material defining said cylinder, at least two segments of which are separated by other segments and are provided with three gas return path bores, means are provided to communicate at a first end of each of said two segments a first one of the gas return path bores therein with a second one of such bores, and means are provided to communicate at the opposite end of each of said two segments the first return path bore therein with the third one of said bores, said respective means incuding a channel in each end of another segment adjacent said respective two segments extending between said first gas return path bore and said second and third bores thereof, respectively.

* * * * *